United States Patent
Underkofler et al.

(10) Patent No.: US 7,261,250 B1
(45) Date of Patent: Aug. 28, 2007

(54) ROLLER GUIDE TAPE PATH

(75) Inventors: Daniel Underkofler, Lafayette, CO (US); William J. Vanderheyden, Loveland, CO (US)

(73) Assignee: Storage Technology Corporation, Louisville, CO (US)

(*) Notice: Subject to any disclaimer, the term of this patent is extended or adjusted under 35 U.S.C. 154(b) by 590 days.

(21) Appl. No.: 10/714,173

(22) Filed: Nov. 14, 2003

(51) Int. Cl.
*G03B 23/02* (2006.01)

(52) U.S. Cl. .................... 242/346.2; 360/132
(58) Field of Classification Search ........... 242/346, 242/346.2; 360/96.3, 132
See application file for complete search history.

(56) References Cited

U.S. PATENT DOCUMENTS

| | | | | |
|---|---|---|---|---|
| 1,760,220 A | * | 5/1930 | Thornton | 242/346.2 |
| 3,641,283 A | * | 2/1972 | Brooke | |
| 3,797,778 A | * | 3/1974 | Downey | 242/346.2 |
| 3,995,790 A | * | 12/1976 | Kelch et al. | 242/346.2 |
| 4,054,252 A | * | 10/1977 | Oishi et al. | 242/346.2 |
| 4,076,186 A | * | 2/1978 | Oishi et al. | 242/346.2 |
| 4,096,538 A | * | 6/1978 | Oishi | 242/346 |
| 4,262,860 A | * | 4/1981 | Hurtig et al. | 242/346.2 |
| 4,275,424 A | * | 6/1981 | Maxey | 242/346.2 |
| 4,301,488 A | * | 11/1981 | Ramisch | 242/346 |
| 4,367,854 A | * | 1/1983 | Saitou | 242/346.2 |
| 4,443,827 A | * | 4/1984 | Hoover et al. | 242/346 |
| 4,986,490 A | * | 1/1991 | Tranquilla | 242/346.2 |
| 5,074,486 A | * | 12/1991 | Vollmann | 242/346 |
| 5,088,172 A | | 2/1992 | Daly | 29/121.4 |
| 5,199,168 A | | 4/1993 | Daly | 29/895.3 |
| 5,414,585 A | | 5/1995 | Saliba | 360/130.21 |
| 5,754,361 A | | 5/1998 | Sakai et al. | 369/95 |
| 5,772,143 A | | 6/1998 | Runyon et al. | 242/346 |
| 5,785,268 A | * | 7/1998 | Saito et al. | |
| 5,860,612 A | | 1/1999 | Runyon et al. | 242/346.1 |
| 6,062,500 A | | 5/2000 | Coles | 242/332.8 |
| 6,141,184 A | | 10/2000 | Daly | 360/130.21 |
| 6,320,727 B1 | | 11/2001 | Cope et al. | 360/130.21 |
| 2003/0016467 A1 | | 1/2003 | Bui et al. | 360/77.12 |
| 2003/0087738 A1 | * | 5/2003 | Poorman | 242/346.2 |

* cited by examiner

*Primary Examiner*—William A. Rivera
(74) *Attorney, Agent, or Firm*—Brooks Kushman P.C.

(57) ABSTRACT

A tape guide mechanism in a storage device is disclosed for defining an improved roller guide tape path. A cartridge reel is provided for supplying tape to a take-up reel. Multiple flanged guides are provided located remotely from the cartridge and take-up reels. A non-flanged post guide is provided located proximate to the take-up reel for increasing a length of the tape path and for permitting the flanged guides to be located remotely from the cartridge and take-up reels so that the flanged guides are not located in proximity to the cartridge or take-up reels. An axis of symmetry exists longitudinally about one or two read/write heads. The tape path length is generally symmetrically disposed about this axis of symmetry.

6 Claims, 2 Drawing Sheets

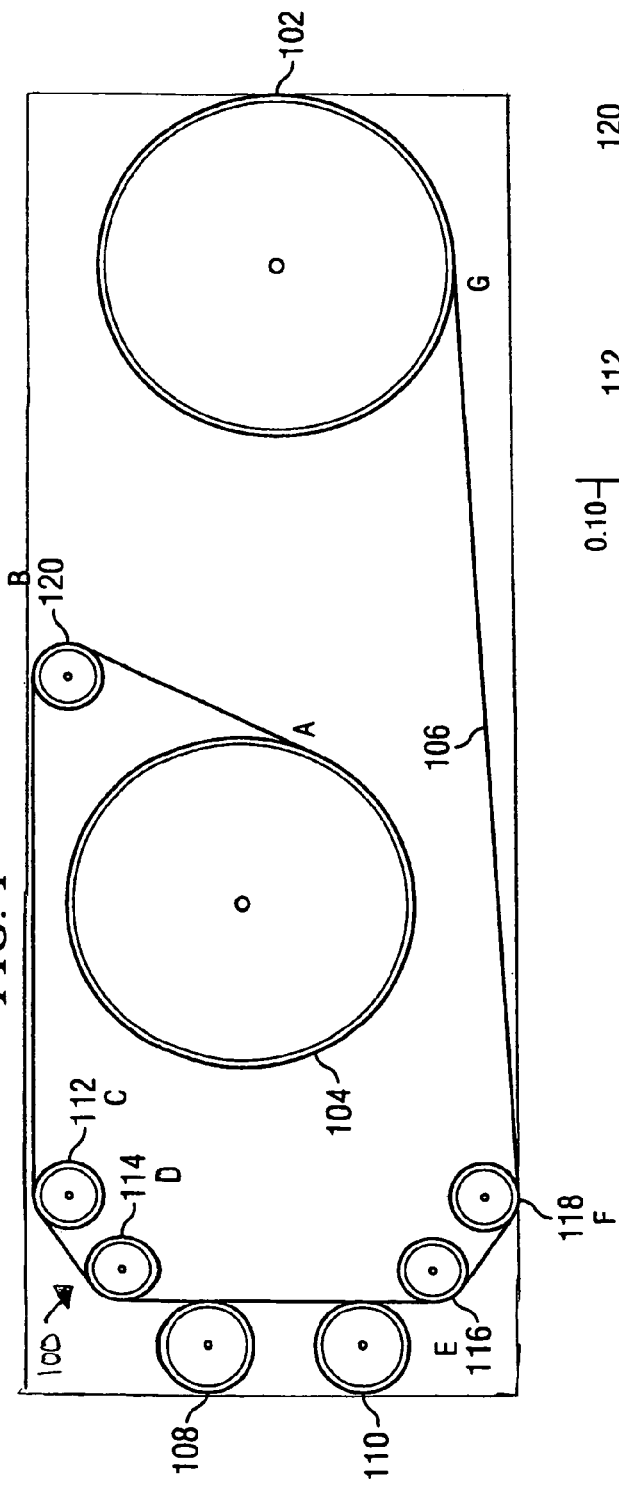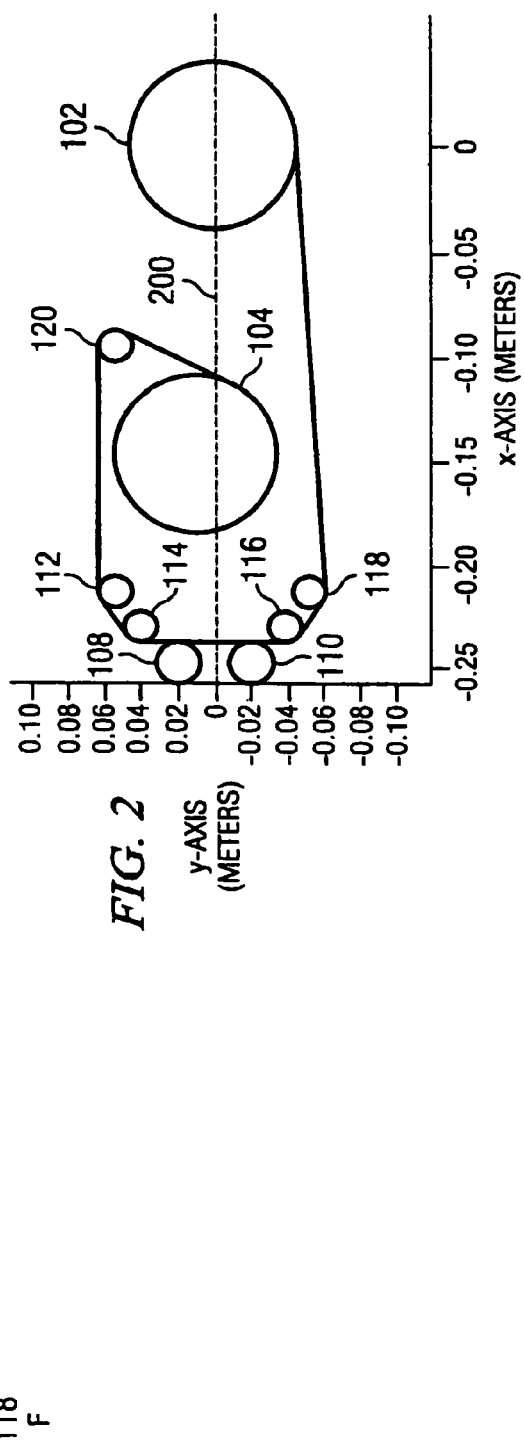

US 7,261,250 B1

ROLLER GUIDE TAPE PATH

BACKGROUND OF THE INVENTION

1. Field of the Invention

The present invention relates generally to data storage devices and particularly to an improved roller guide tape path within a data storage device.

2. Background of the Invention

Magnetic tape is frequently used to store digital data. Such tape may be housed in a tape cartridge that protects the tape from damage. Tape drive systems for reading information from or writing information on magnetic tapes require tape guides to ensure that the tape is positioned correctly relative to the magnetic read/write heads in order to minimize lateral tape motion (LTM).

One type of prior tape path uses rollers having integral non-compliant fixed upper and lower flanges to guide the tape. Problems arising from this type of tape guide include friction generated from the tape movement against the fixed flanges which results in tape speed variations, tape resonance excitation, and tape debris generation. Also, the tape frequently varies in width, so that the flanges must be separated in excess of the tape width which results in vertical tape movement.

Magnetic tape may be made more useful and cost effective by increasing the density of information stored on the magnetic tape. One method of increasing information density is to decrease the thickness of the tape thereby permitting more tape to be stored in a given volume.

Decreasing the thickness of magnetic tape creates difficulties in a tape transport system. Thinner tape more easily stretches, increasing the possibility of read and write errors. Thin tape is also susceptible to folding, kinking, creasing, curling and other mechanical damage. These difficulties are exacerbated by complex tape transport systems requiring rollers, guides, and the like to drive the tape and position the tape relative to the tape head.

Current storage device designs provide for a very compact housing for holding the tape guide mechanism. This requires a short tape path. A longer tape path is desirable to reduce lateral tape motion, reduce skew, reduce cross-web tension, and reduce loads on tape edges.

Therefore, the current technology would be improved by providing an improved roller guide tape path for use with thin tape so that a longer tape path may be provided in a compact housing for holding the tape guide mechanism.

SUMMARY OF THE INVENTION

A tape guide mechanism in a storage device is disclosed for defining an optimized roller guide tape path. A cartridge reel is provided for supplying tape to a take-up reel. Multiple flanged guides are provided located remotely from the cartridge and take-up reels and proximate to the read/write head(s). A non-flanged post guide is provided located proximate to the take-up reel for increasing the length of the tape path and for permitting the flanged guides to be located remotely from the cartridge and take-up reels so that the flanged guides are not located in proximity to the cartridge or take-up reels. An axis of symmetry exists longitudinally about one or two read/write heads. The tape path length is generally symmetrically disposed about this axis of symmetry.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a top view of a tape guide mechanism in a storage device including an optimized roller guide tape path in accordance with the present invention; and FIG. 2 is a top view of the tape guide mechanism of FIG. 1 depicted using a two-axis coordinate system in accordance with the present invention;

DETAILED DESCRIPTION OF THE PREFERRED EMBODIMENT

Figure 3:
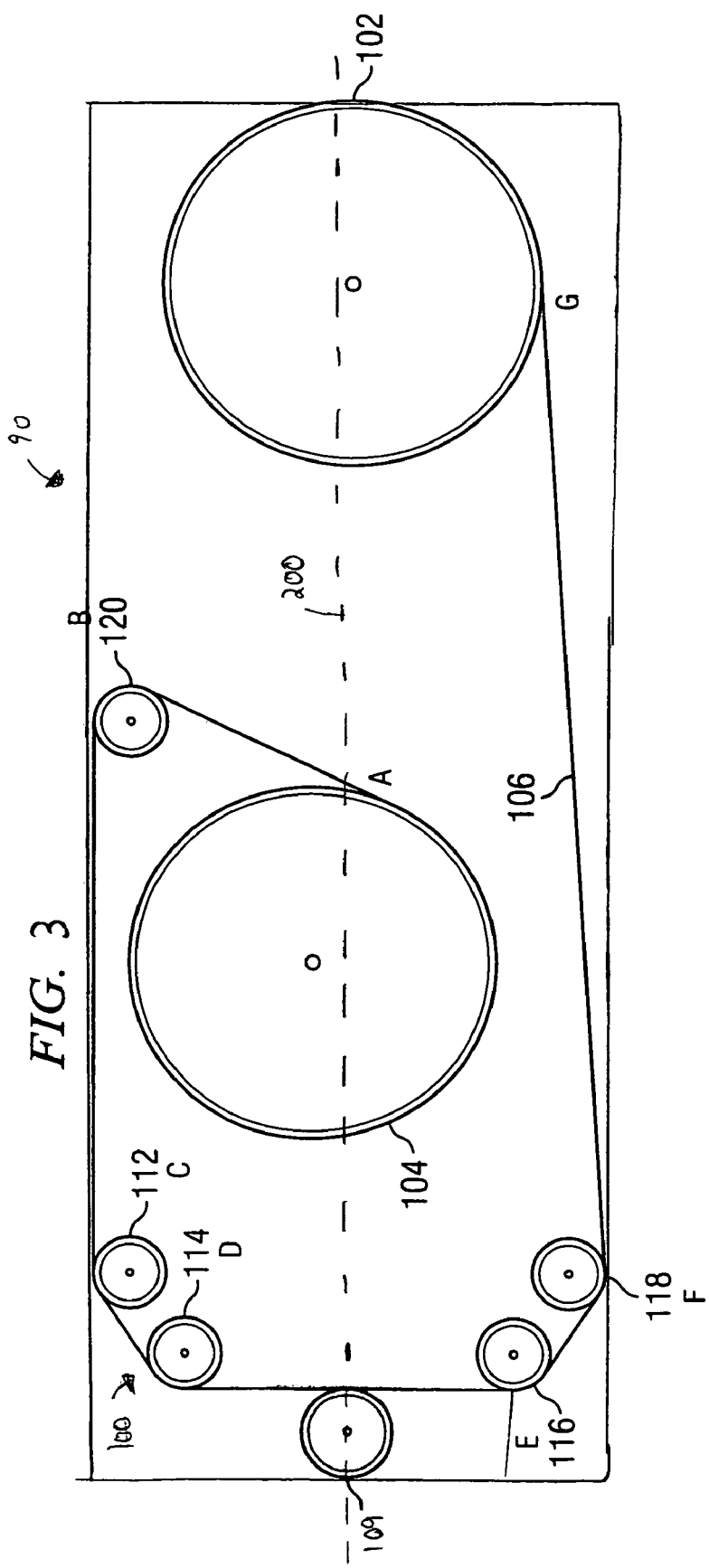
FIG. 3 is a top view of a tape guide mechanism including an optimized roller guide tape path in accordance with the present invention.

A preferred embodiment of the present invention and its advantages are better understood by referring to the figures, like numerals being used for like and corresponding parts of the accompanying figures.

FIG. 1 is a top view of a tape guide mechanism 100 in a storage device 90 including an optimized roller guide tape path in accordance with the present invention. FIG. 2 is a top view of tape guide mechanism 100 of FIG. 1 depicting preferred dimensions of the various components of the mechanism using a two-axis coordinate system in accordance with the present invention. The dimensions of the x-axis and y-axis depicted by FIG. 2 are in meters.

Referring to FIGS. 1 and 2, the tape guide mechanism 100 includes a cartridge reel 102 for supplying tape to a drive reel 104. The tape 106 travels in a tape path between reels 102 and 104. The entire tape path extends from point A to point G.

The present invention describes a tape guide mechanism that defines a long tape path. Long length tape paths reduce lateral tape motion, reduce skew, reduce cross-web tension, and reduce loads on tape edges. Therefore, it is desirable to increase the length of the tape path. The design of the present invention permits use of as much of the housing as possible in order to maximize the length of the tape path.

Mechanism 100 includes a pair of read/write heads 108 and 110 for reading data from and writing data to tape 106 as it passes heads 108 and 110. Alternatively, a single read/write head 109 may be used that is disposed along the axis 200 (see FIG. 3).

A plurality of stationary guide rollers 112, 114, 116, and 118 are provided for guiding tape 106 through the tape path. Guide rollers 112, 114, 116, and 118 are preferably flanged and grooved. Rollers 112, 114, 116, and 118 limit lateral tape motion, skew, and cross-web tension. Rollers 112, 114, 116, and 118 provide friction with the tape back surface to keep rollers 112, 114, 116, and 118 spinning at the tape's speed. This avoids wear on the tape edge and guide flanges. This friction also slows down lateral tape motion transients to an extent that the read/write heads 108 and 110 can follow the tape motions. The tape guides only contact the back side of the tape so that there is less damage to the data on the magnetic side of the tape.

A non-flanged stationary post guide 120 is also provided for extending the total length of the tape path. The inclusion of post guide 120 in mechanism 100 also permits guide rollers 112, 114, 116, and 118 to be moved as far as possible from reels 104 and 102. Post guide 120 is preferably a non-spinning guide.

The majority of the tape path, from points B to G, is symmetrically disposed about a longitudinal axis 200 forming a generally U-shaped path. The longitudinal axis 200 generally bisects the cartridge reel 102.

The generally U-shaped path provides a similar response regardless of the direction of tape travel. The tape path from point B to point C (tape path B-C) is generally parallel to both axis 200 and to the tape path from point F to point G (tape path F-G). The tape path from point D to point E (tape path D-E) is generally perpendicular to axis 200, and to the tape path B-C and the tape path F-G. Reels 102 and 104 may be moved so as to provide a more or less symmetrical path.

Rollers 116 and 118 and read/write head 110 are located in a first portion of tape mechanism 100 in positions that correspond to the positions of rollers 112 and 114 and read/write head 108 in the second portion of tape mechanism 100. The pair of rollers 116 and 118 may be adjacent, as illustrated. The pair of rollers 112 and 114 may also be adjacent, as illustrated.

The tape mechanism 100 will typically be housed within a housing (not shown) in a storage device 90, as illustrated in FIG. 1. The housing is a finite size and a particular shape as determined by marketing requirements. The size and shape of the housing will limit the placement of the various rollers, guides, heads, and reels of the tape mechanism. According to the present invention, the addition of post guide 120 serves to lengthen the total tape path and may be positioned so that the tape path is nearly symmetrical in length about the pair of read/write heads 108 and 110.

In this manner, flanged rollers 112, 114, 116, and 118 may be located in the housing remotely as far away as possible from reels 104 and 102 in order to lengthen the tape path. Rollers 112, 114, 116, and 118 are located close to read/write heads 108 and 110. In particular, rollers 112 and 114 are located proximate to read/write head 108, and rollers 116 and 118 are located proximate to read/write head 110.

Rollers 112 and 118 are positioned to be as far away as specification limits on tape edge load will allow from adjacent rollers 114 and 118 respectively in order to maximize lateral tape tracking performance. Rollers 114 and 116 should be positioned as closely as possible to heads 108 and 110, respectively.

As illustrated in FIG. 3, a single read/write head 109 may be disposed along the axis 200 in accordance with the present invention.

Figure 4:
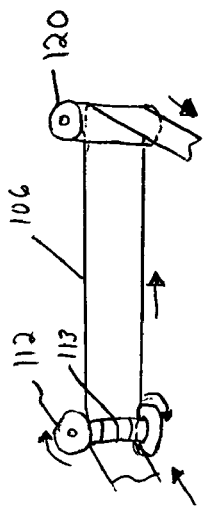
FIG. 4 is a partial schematic view of a tape guide mechanism in accordance with the present invention.

As illustrated in FIG. 4, any known flanged roller that is capable of spinning may be used to implement roller 112. Preferably, the roller 112 has grooves 113. The roller 112 illustrated may also be used to implement rollers 114, 116 and 118. Any known non-flanged, guide may be used to implement guide 120. Although a smooth, non-spinning guide, is preferred, a spinning guide may also be used.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape guide mechanism in a storage device for defining a tape path comprising:
   a cartridge reel for supplying tape to a take-up reel;
   a plurality of flanged guides located remotely from said cartridge and take-up reels;
   a non-flanged post guide located proximate to said take-up reel for increasing a length of said tape path and for permitting said plurality of flanged guides to be located remotely from said cartridge and take-up reels;
   wherein flanged guides are not located in proximity to said cartridge or take-up reels;
   said cartridge reel being bisected by a longitudinal axis of said tape path;
   a pair of read/write heads symmetrically located about said axis;
   said plurality of flanged guides including a first pair of flanged guides located proximate to a first one of said read/write heads and a second pair of flanged guides located proximate to a second one of said read/write head;
   said tape path including a portion that starts at said first pair of flanged guides and ends at said second pair of flanged guides; and
   said portion of said tape path being symmetrical about said axis.

2. The mechanism according to claim 1, further comprising:
   said tape path including a first portion that is generally parallel to said axis, a second portion that is generally perpendicular to said axis, and a third portion that is generally parallel to said axis.

3. The mechanism according to claim 1, further comprising:
   said first pair of flanged guides being adjacent to each other; and
   said second pair of flanged guides being adjacent to each other.

4. The mechanism according to claim 1, further comprising:
   said non-flanged post guide being non-spinning.

5. The mechanism according to claim 1, further comprising:
   said plurality of flanged guides being grooved.

6. A tape guide mechanism in a storage device for defining a tape path comprising:
   a cartridge reel for supplying tape to a take-up reel;
   a plurality of grooved flanged guides located remotely from said cartridge and take-up reels;
   a non-spinning non-flanged post guide located proximate to said take-up reel for increasing a length of said tape path and for permitting said plurality of flanged guides to be located remotely from said cartridge and take-up reels;
   wherein flanged guides are not located in proximity to said cartridge or take-up reels;
   said cartridge reel being bisected by a longitudinal axis of said tape path;
   a pair of read/write heads symmetrically located about said axis;
   said plurality of flanged guides including a first pair of adjacent flanged guides located proximate to a first one of said read/write heads and a second pair of adjacent flanged guides located proximate to a second one of said read/write head;
   said tape path including a portion that starts at said first pair of flanged guides and ends at said second pair of flanged guides; and
   said portion of said tape path being symmetrical about said axis.

* * * * *